United States Patent [19]

Scholz et al.

[11] 4,243,248

[45] Jan. 6, 1981

[54] AIR BAG SYSTEM FOR THE PROTECTION OF THE PASSENGERS OF MOTOR VEHICLES IN CASE OF ACCIDENTS

[75] Inventors: Hansjügen Scholz, Waldenbuch; Hans-Gerd Backhaus, Stuttgart; Luigi Brambilla, Böblingen, all of Fed. Rep. of Germany

[73] Assignee: Daimler-Benz Aktiengesellschaft, Fed. Rep. of Germany

[21] Appl. No.: 949,243

[22] Filed: Oct. 6, 1978

[30] Foreign Application Priority Data

Nov. 11, 1977 [DE] Fed. Rep. of Germany ....... 2745620

[51] Int. Cl.³ ............................................. B60R 21/08
[52] U.S. Cl. ................................................... 280/735
[58] Field of Search ............... 280/742, 743, 729, 735, 280/734, 730, 731, 732, 736; 180/282, 274

[56] References Cited

U.S. PATENT DOCUMENTS

| | | | |
|---|---|---|---|
| 3,684,309 | 8/1972 | Uchiyamada et al. | 280/735 |
| 3,750,100 | 7/1973 | Ueda | 280/735 |
| 3,774,714 | 11/1973 | Usui et al. | 280/735 |
| 3,868,126 | 2/1975 | Radke et al. | 280/735 |
| 3,871,472 | 3/1975 | Hosaka et al. | 280/735 |
| 3,874,695 | 4/1975 | Abe et al. | 280/735 |
| 3,911,391 | 10/1975 | Held et al. | 280/735 |
| 3,966,224 | 6/1976 | Campbell et al. | 280/735 |

*Primary Examiner*—David M. Mitchell
*Attorney, Agent, or Firm*—Craig & Antonelli

[57] ABSTRACT

An airbag system for protecting the occupants of an automotive vehicle during collisions, the airbag system including airbags for the driver and front-seat passenger, and a sensor system for detecting the increase in deceleration of the vehicle during a collision and for triggering controlled inflation of the airbags in accordance with the detected increase in deceleration. The airbag associated with the front-seat passenger being inflatable in two stages, the first inflation stage being triggerable in response to an output signal from the sensor system generated when the detected increase in deceleration is equal to or greater than a first threshold value, and the second inflation stage being triggerable in response to an output signal from the sensor system generated when the detected increase is equal to or greater than a second threshold value which is higher than the first threshold value. The airbag associated with the driver being inflatable only when the second threshold value has been equalled or exceeded. The sensor system is provided with a delay arrangement for delaying at least the triggering of the second inflation stage with respect to the triggering of the first inflation stage by a predetermined delay time period.

15 Claims, 2 Drawing Figures

AIR BAG SYSTEM FOR THE PROTECTION OF THE PASSENGERS OF MOTOR VEHICLES IN CASE OF ACCIDENTS

The present invention relates to an airbag system for protecting the occupants of an automotive vehicle during collisions with airbags for the driver and the front-seat passenger, which airbags can be controllably inflated in response to output signals from a sensor system detecting the increase in deceleration during an accident, and wherein the airbag associated with the front-seat passenger can be inflated in two stages, the first of such stages being triggered once the increase in deceleration has reached a first, lower threshold value and the second of such stages being triggerable upon reaching a second, higher threshold value, whereas the airbag associated with the driver can be inflated only when the second threshold value of the increase in deceleration has been reached.

In conventional airbag systems of this type, the airbag associated with the driver has, in the inflated condition, a volume of about 60 liters, whereas the airbag associated with the front-seat passenger is considerably larger and assumes in the first inflating stage a gaseous volume of about 80 liters and in the second inflating stage a gaseous volume of about 70 liters. The airbags are inflated by the "burning up" of solid propellant charges comparable to small solid-propellant rockets which develop the aforementioned gaseous volumes during their "burning up" which takes about 20–25 msec. In this connection, the burning of the solid propellant charges is initiated by the electric ignition of so-called primer pellets. During the ignition of the propellant charges and during the deploying of the airbags, a sharp report is produced the sonic pressure which is very high, so that this report is not only merely unpleasant for the passengers of a vehicle, but can also lead to injuries, such as rupturing of the eardrum, for example. To limit this danger, conventional airbag systems are, therefore, triggered in stages wherein, in a first stage, the first partial volume of the front-seat passenger's airbag is inflated and, in a second stage, the residual volume of the front-seat passenger's airbag and the driver's airbag are inflated. This staggered triggering makes it more readily possible to adapt the airbag system to the seriousness of the collision and reduces, due to the division into the two triggering stages, the maximum sonic pressure to which the occupants of an automotive vehicle are exposed. The sensor system detecting the step-up or increase in deceleration during a collision, which comprises one or more conventional accelerometers, when reaching or exceeding the lower threshold value $S_1$, triggers the first stage and, when reaching or exceeding the second threshold value $S_2$ of the increase in deceleration, triggers the second stage of the inflation process of the airbags, can be constructed so that at a specific speed of impact and type of impact (for example a frontal crash at 50 km./h.) an optimum chronological distance between the first and second stages, governing for the reduction of the sonic pressure, is ensured. Such as optimization, however, is possible in the conventional airbag systems only for a quite specific type of crash and, in conjunction therewith, only for a restricted range of impact velocity, i.e., only for a small part of the crash situations possible in total.

It is, therefore, an object of the invention to provide an improved airbag system of the type mentioned in the foregoing so that, independently of the chronological progression of the increase in deceleration occurring during a collision, the optimum interval between the triggering of the first inflation stage and the triggering of the second inflation stage of the airbag system is ensured.

This object has been attained in accordance with the present invention by providing a delay member which retards at least the triggering of the second inflation stage of the front-seat passenger's airbag with respect to the triggering of the first inflation stage by a definite time period $\Delta T_1$.

Such a delay member, capable of very satisfactorily maintaining the chronological distance between the two inflation stages in the optimum range, i.e., with small deviations, independently of the chronological progression of the increase in deceleration, this optimum range being between 15 and 20 msec., wherein a delay period of 18 msec. proved to be the optimum value as a result of numerous systematic experiments, can be realized technically with the aid of simple devices. For example, this can be realized by a switching relay which attracts in the aforementioned delay period, if the passage of current through the relay winding is controlled by an electronic switch, which latter is actuated when the voltage output signal of the accelerometer has reached the level corresponding to the lower threshold value $S_1$. It is likewise possible, with the aid of an acceleration-proportional output signal, to actuate, when the first threshold value is reached, a pulse generator such as an astable multivibrator with a pulse repetition frequency adapted to the desired delay period, this astable multivibrator emitting an ignition pulse if, in the meantime, the second, higher threshold value of the increase in deceleration has been attained, which fact can be ascertained by a conventional AND circuit. In any event, a person skilled in the art has numerous possibilities available for constructing delay members with the required delay times.

One embodiment of the present invention, which can be advantageously constructed with small expenditure in circuitry, resides in that the sensor system simultaneously triggers the second inflation stage of the front-seat passenger's airbag and the inflation of the driver's airbag. In this case, the inflation of the entire airbag system is distributed between two ignition processes or inflation stages.

Another embodiment of the invention, which is even more advantageous for the division and thus reduction of the maximum sonic pressure, consists in that the sensor system triggers the inflation of the driver's airbag upon reaching the second, higher threshold value $S_2$ of the increase in deceleration occurring during aa collison. The propellant charge of the driver's airbag is then already ignited before the second inflation stage of the front-seat passenger's airbag is triggered after the predetermined delay period. In such a case, though, there exists, in turn, the possibility that, at very high impact velocities, the instant of igniting the propellant charge of the driver's airbag approaches increasingly the instant of triggering the first stage of th front-seat passenger's airbag, which then leads, in turn, to a relative increase in the sonic pressure at this point in time.

This, however, can be avoided in accordance with an embodiment of this invention by providing the sensor system with another delay member which retards the triggering of the inflation process for the driver's airbag with respect to the triggering of the first inflation stage for the front-seat passenger's airbag by a definite time period $\Delta T_2$ which is shorter than the time period $\Delta T_1$ by which the triggering of the second inflation stage of the front-seat passenger's airbag is retarded with respect to the instant of triggering in the first inflation stage. If, in this connection, $\Delta T_2$ is chosen to be approximately equal to $\frac{1}{2}\Delta T_1$, i.e., if the sequence of the ignition processes is selected to be equidistant chronologically, then a quasi continuous development of the sonic pressure is the result, which is most advantageous under the aforementioned considerations.

An accident wherein the front-seat passenger's airbag as well as the driver's airbag are inflated can take place, for example, as follows:

A vehicle travelling at a speed V drifts too far to the outside while traversing a curve and glances off a vehicle, approaching in the opposite direction, with its longitudinal side. During the contact period, the velocity of the vehicle is violently and suddenly reduced, the increase in deceleration occurring in total being sufficient for reaching the first threshold value $S_1$ and igniting the first inflation stage of the front-seat passenger's airbag. After this first impact, the vehicle begins to sideslip, continuing its movement essentially in a linear direction while simultaneously rotating about its vertical axis of inertia. Finally, the sideslipping vehicle hits an obstacle, for example, a guide rail, extending at an acute angle with respect to the path of motion of the vehicle. During this occurrence, a large portion of the kinetic energy of the vehicle is normally dissipated under deformation of the car body and of the guard rail, and finally the vehicle comes to a standstill after having been thrown back onto the road lane. Only when the vehicle impinges against the guard rail does the increase in deceleration become so large that also the second threshold value $S_2$ is exceeded and the second inflation stage of the front-seat passenger's airbag is ignited, at that time when the second threshold value $S_2$ has been exceeded and also the time delay $\Delta T_1$ has elapsed, which can happen in some cases only after exceeding the threshold value $S_2$. Depending on the construction of the airbag system, the driver's airbag is inflated either already when the second threshold value $S_2$ has been attained or simultaneously with the second inflation stage of the front-seat passenger's airbag, or after a specific delay period $\Delta T_2$ which is shorter than the delay period $\Delta T_1$ if the second threshold value has been reached already prior to the elapse of this second, shorter delay time.

It can be seen that with such a collision situation a time curve of the increase in deceleration effective on the vehicle is produced which shows a first maximum during the collision of the vehicles and a second maximum during the impact of the vehicle against the guard rail. It can also be seen that these maxima are considerably lower than in case the vehicle crashes frontally against a fixed barrier at the same velocity. Yet, when determining the threshold values $S_1$ and $S_2$, it is, of course, possible to refer to this theoretically well-defined instance, thus obtaining a sequence of inflation processes which is an optimum for most of the accidents which occur in reality, if the first threshold value $S_1$ is determined so that the first inflation stage is activated when the vehicle is involved in a frontal crash against a fixed barrier at a velocity of 18 km./h. $\pm 10\%$, and if the second threshold value $S_2$ is determined so that the activation of the second inflation stage of the front-seat passenger's airbag and/or the inflation of the driver's airbag takes place when the vehicle impinges on a fixed barrier at a speed of 25 km./h.

The values which are maximally advantageous may differ somewhat from one type of vehicle to the next, so that the optimum values, which can vary by $\pm 10\%$, must in certain cases be determined by experiments.

The sensor system, which comprises one or several accelerometers and which produces the control signals for the final ignition stages controlling the inflation devices, can be constructed so that these control signals, which are to be compared with the threshold values $S_1$ and $S_2$, are proportional to the respective values of the increase in deceleration. In this case, specific instantaneous values of the increase in deceleration are correlated with the various inflation stages.

It is also particularly advantageous if these control signals are proportional to the time integral $\int b(t)dt$ of the increase in deceleration $b(t)$ occurring during the collision situation. For this purpose, the acceleration-proportional voltage output signal of an accelerometer can be fed to a conventional integrating circuit. The output signal of the integrating circuit, to be compared with the threshold values $S_1$ and $S_2$, is then essentially proportional to the voltage-time area below an acceleration (voltage)/time curve plotted in the usual way. The differently large values of this area or of the time integral of the increase in deceleration then correspond to the two differently high threshold values $S_1$ and $S_2$. As compared to an airbag system responding merely to certain instantaneous values of the increase in deceleration, the advantage is achieved in the present mode of operation that, for example, the second inflation stage is even activated if the increase in deceleration after activation of the first ignition stage rises thereafter only slightly, but is maintained for a relatively long period of time, or if several additional impacts follow the first crash, which by themselves would only lead to the activation of the first inflation stage.

However, in order to prevent the concomitant activation of the airbag system in case of a controlled braking operation wherein the vehicle is sharply braked from a very high initial velocity to a low speed, wherein considerably high values are attained for the increase in deceleration over a relatively long period of time, and wherein the time integral of the increase in deceleration then would likewise assume values comparable to those during a collision, it is advantageous to provide that the signal to be compared with the threshold values decreases with a decay constant of a suitable magnitude. This can be realized by simple electronic circuits as is known in the art. It is well understood that this time constant must be considerably larger than the delay time $\Delta T_1$ and can range on the order of one or several seconds.

These and other objects, features and advantages of the present invention will become more apparent from the following description when taken in connection with the accompanying drawing which shows, for purposes of illustration only, several embodiments in accordance with the present invention, and wherein:

Figures 1, 2:
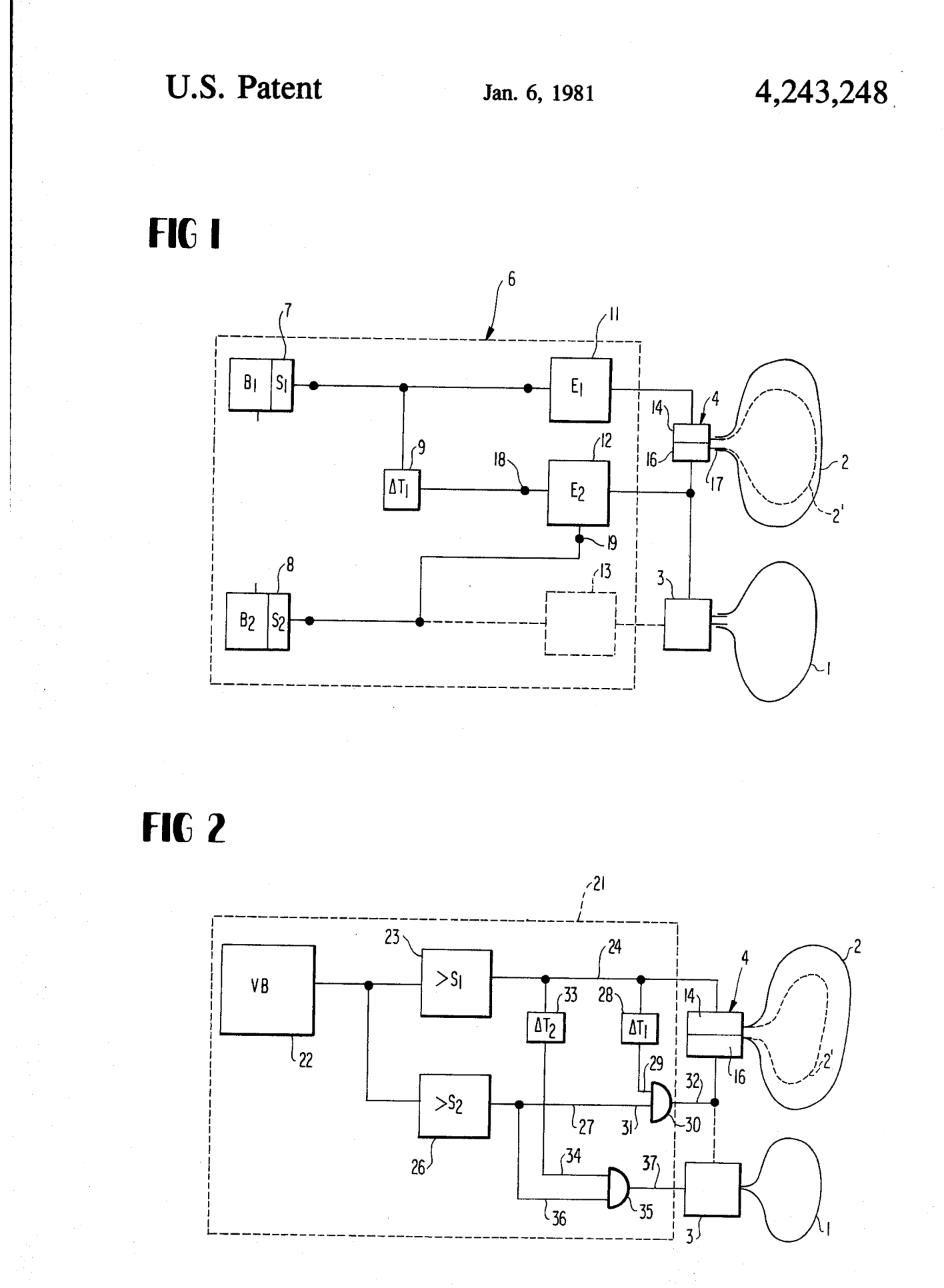

FIG. 1 is a block circuit diagram of an embodiment of the airbag system of the present invention with a sensor system comprising two accelerometers, and also illustrating a modified construction; and FIG. 2 is a block diagram arrangement of another embodiment with a sensor system having only one accelerometer.

Referring now to the drawing wherein like reference numerals are utilized to designate like parts in the figures, there is illustrated in FIG. 1 an airbag system for a passenger car, not shown in detail, including an airbag 1 for the driver and an airbag 2 for the front-seat passenger, inflating devices 3 and 4 with electrically activatable primer pellets, not shown in detail, which ignite a solid propellant charge. The latter produces, in a chemical reaction initiated by the ignition, the amount of gas required to inflate the airbags 1 and 2. The airbag system further includes a sensor system 6 with two accelerometers 7 (detector section $B_1$ and threshold section $S_1$) and 8 (detector section $B_2$ and threshold section $S_1$), a time delay member 9, and final ignition stages 11 ($E_1$) and 12 ($E_2$). These final ignition stages produce the ignition voltages for the inflation devices 3 and 4 in accordance with the electrical voltage output signals generated by the accelerometers 7 and 8 and may have a constant relationship to the values generated by the accelerometers 7 and 8 as for example being proportional thereto. The inflating device 4 for the front-seat passenger's airbag has a first ignition chamber 14 and a second ignition chamber 16, both of which are in communication, via a gas nozzle 17, with the inner space of the front-seat passenger's airbag 2 as shown schematically in FIG. 1. The primer pellet, disposed in the first ignition chamber, is ignited by the output signal of the first final ignition stage 11, the input signal of which is the output signal from the first accelerometer 7. The accelerometer 7 emits a control voltage output signal at a constant level as soon as the increase in deceleration detected by the accelerometer reaches or exceeds a lower threshold value $S_1$. Then, in a first inflating stage, the ront-seat passenger's airbag 2 is inflated up to the partial volume 2' of about 80 liters, indicated in dashed lines.

The output signal of the first accelerometer 7 is furthermore applied with a time delay determined by the time constant or response time $\Delta T_1$ of the delay member 9 to a first control input 18 of the second final ignition stage 12. The latter receives, at a second control input 19, the output signal from the second accelerometer 8, which produces an output signal at a constant voltage level as soon as the value of the increase in deceleration detected by this accelerometer is equal to or larger than a second threshold value $S_2$, the threshold value $S_2$ being larger than the first threshold value $S_1$. The second final ignition stage 12 yields an ignition output signal for the primer pellet of the second ignition chamber 16 of the inflating device 4 for the front-seat passenger's airbag, and for the primer pellet of the inflating device 3 for the driver's airbag 1 only if there is applied to its one input 18 the output signal from the first accelerometer 7 with the aforementioned time delay, and there is applied to its other input 19 the output signal from the second accelerometer 8. Then, the second stage of the inflation procedure of the front-seat passenger's airbag 2 and the inflation step for the driver's airbag 1 are triggered. Thus, the effect of this circuit is that, in the first inflation stage, only the front-seat passenger's airbag 2 is filled with a gaseous volume of about 80 liters, and in a second inflation stage, the residual volume of the front-seat passenger's airbag 2, comprising about 70 liters, and the volume of the driver's airbag 1, comprising about 60 liters, are simultaneously inflated, wherein the two inflation states are delayed with respect to each other by a time period which is independent of the chronological progression of the increase in deceleration between the two threshold values $S_1$ and $S_2$.

If a third final ignition stage 13 is additionally provided, as shown in dashed lines, in the right-hand lower portion of FIG. 1, which stage produces an ignition signal for the primer pellet of the inflating device 3 for the driver's airbag 1 upon the occurrence of an output signal from the second accelerometer 8, then the airbag 1 is inflated as soon as the higher threshold value $S_2$ of the increase in deceleration has been reached. The result is achieved that, in case of high impact velocities at which the higher threshold value $S_2$ is attained clearly before the elapsing of the delay time $\Delta T_1$, the inflation of the driver's airbag 1 commences correspondingly earlier so that, on the one hand, the evolution of the sonic pressure is distributed over three triggering instants, and the driver, as also necessary during a collision which takes place in such a case, is likewise protected fully at an earlier point in time.

FIG. 2 shows an airbag system which differs with respect to the FIG. 1 embodiment only by the construction of the sensor system 21. In the sensor system only a single accelerometer 22 (VB) is provided which produces a voltage output signal that rises in a constant relation to the increase in deceleration detected by the accelerometer 22. The output signal of the accelerometer 22 is fed, as the control input signal, to a first final ignition stage 23 which compares this input signal with a lower threshold value $S_1$ and yields via an output line 24 a voltage output signal with a preferably constant level as soon as the lower limiting value $S_1$ of the increase in deceleration has been reached or exceeded. The output signal of the accelerometer 22 is furthermore applied as the input signal to a second final ignition stage 26 which compares this input signal with a second, higher threshold value $S_2$ and produces a constant voltage output signal at the output line 27 as soon as the higher threshold value $S_2$ has been reached or exceeded. Via the output line 24 of the first final ignition stage 23, the ignition voltage for the first inflation stage of the front-seat passenger's airbag is applied to the primer pellet of the first ignition chamber 14 of the inflation device 4 of the front-seat passenger's airbag 2.

The output signal of the first final ignition stage 23 is applied via a first time delay member 28, with a delay time $\Delta T_1$ of about 18 msec. ±4.5 msec., to one input 29 of a first double-input AND gate 30, the other input 31 of which is fed with the output signal of the second final ignition stage 26 via the output line 27. The output line 32 of this first double AND gate 30 constitutes the ignition signal line for the primer pellet of the second ignition chamber 16 for the second inflation stage of the front-seat passenger's airbag 2.

By way of a second time delay member 33, with a delay time $\Delta T_2$ of about 9±2 msec., the output signal of the first final ignition stage 23 is applied to one input 34 of a second double-input AND gate 35, the other input 36 of which is fed with the output signal of the second final ignition stage 26. The output line 37 of this second AND gate 35 constitutes the ignition signal line for the primer pellet of the inflating device 3 of the driver's airbag 1.

The mode of operation of this circuit is as follows:

Upon reaching the first threshold value $S_1$, the first inflation stage of the front-seat passenger's airbag is triggered, during which, in the same way as in the embodiment of FIG. 1, the first partial volume 2' of the front-seat passenger's airbag is inflated within a period of about 30 msec. If the second threshold value $S_2$ is reached earlier than 9 msec. after triggering of the first inflation stage, the primer pellet of the inflation device 3 for the driver's airbag 1 is ignited after 9 msec., i.e., after elapse of the delay period $\Delta T_2$ of the second delay member 33 with the driver's airbag being then inflated within about 30 msec. After another 9 msec., i.e., after elapse of the delay period $\Delta T_1$ of the second ignition member 28, the primer pellet of the second ignition chamber 16 is ignited, and the residual volume of the front-seat passenger's airbag 2 is inflated. If the output signal of the first double-input AND gate 30 is utilized as the ignition signal for the inflating device 3 of the driver's airbag, as shown in dashed line, then the second double-input AND gate 35 and the second time delay member 33 can be omitted, thus obtaining an airbag system having the same sequence of inflation stages as in the embodiment according to FIG. 1 illustrated in full lines.

It is noted that the accelerometers 7, 8 and 22 may include integrating circuits such that the outputs of the accelerometer portions are integrated whereby an output representative of the chronological progression of the increase in deceleration proportional to the time integral $\int b(t)dt$ of the time varying increase in deceleration $b(t)$ is provided and compared with the threshold values $S_1$ and $S_2$ for triggering the inflation of the airbags.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. In an airbag system for protecting the occupants of an automative vehicle during collisions, the airbag system including airbags for the driver and front-seat passenger, and a sensor system for detecting the increase in deceleration of the vehicle during a collision and for triggering controlled inflation of the airbags in accordance with the detected increase in deceleration, the airbag associated with the front-seat passenger being inflatable in two stages, the first inflation stage being triggerable in response to an output signal from the sensor system generated when the detected increase in deceleration is one of equal to and greater than a first threshold value, and the second inflation stage being triggerable in response to an output signal from the sensor system generated when the detected increase is one of equal to and greater than a second threshold value which is higher than the first threshold value, the airbag associated with the driver being inflatable only when the second threshold value has been one of equalled and exceeded, the improvement in that the sensor system comprises first delay means for delaying at least the triggering of the second inflation stage with respect to the triggering of the first inflation stage by a first predetermined delay time period, the sensor system further comprising detector means for detecting the increase in deceleration of the vehicle and providing an output indicative thereof, threshold means for comparing the detected output signal with at least one of the first and second threshold values and providing an output signal when at least one of the first and second threshold values are at least one of equalled and exceeded, and triggering means responsive to the threshold means for controlling triggering of the airbags, the threshold means including a first threshold value means set at the first threshold value and associated with the detector means and a second threshold value means set at the second threshold value and associated with the detector means, and the triggering means including at least first trigger means for triggering the first inflation stage and second trigger means for triggering at least the second inflation stage, the first threshold value means providing an output signal to the first trigger means and to the first delay means, the first delay means providing a delayed output signal to the second trigger means, the second threshold value means providing an output signal to the second trigger means, the second trigger means triggering at least the second inflation stage in response to the delayed signal and the output signal of the second threshold value means.

2. An airbag system according to claim 1, wherein the first delay means provides a first predetermined delay period of 18 msec. $\pm 4.5$ msec.

3. An airbag system according to claim 1, wherein the first delay means provides a first predetermined delay period of between 15 and 20 msec.

4. An airbag system according to claim 3, wherein the first predetermined delay period is about 18 msec.

5. An airbag system according to claim 1, wherein the sensor system provides an output signal for simultaneously triggering the second inflation stage of the airbag associated with the front-seat passenger and the inflation of the airbag associated with the driver.

6. An airbag system according to claim 1, wherein the sensor system further comprises second delay means for delaying the inflation of the airbag associated with the driver with respect to the triggering of the first inflation stage of the airbag associated with the front-seat passenger by a second predetermined time period, the second predetermined delay period being shorter than the first predetermined delay period of time by which the triggering of the second inflation stage of the airbag associated with the front-seat passenger is delayed with respect to the triggering of the first inflation stage thereof.

7. An airbag system according to claim 6, wherein the second predetermined delay period of the second delay means is about one-half the first predetermined delay period provided by the first delay means.

8. An airbag system according to claim 4 or 6, wherein the first threshold value is set at a value so that the triggering of the first inflation stage takes place at least at a point in time corresponding to when a vehicle crashes against a fixed barrier at a velocity of at least 18 km./h. $\pm 10\%$.

9. An airbag system according to claim 4 or 6, wherein the second threshold value is set at a value such that the triggering of at least one of the second inflation stage of the airbag associated with the front-seat passenger and the inflation of the airbag associated with the driver takes place at a point in time corresponding to when a vehicle crashes frontally against a fixed barrier at a velocity of at least 25 km./h. $\pm 10\%$.

10. An airbag system according to claim 1, further comprising integrating means for integrating the output of the detector means so as to provide an output proportional to the time integral $\int b(t)dt$ of the time varying increase in deceleration $b(t)$ for comparison with the first and second threshold values by the threshold means.

11. An airbag system according to claim 1, wherein the second trigger means also triggers inflation of the airbag associated with the driver.

12. An airbag system according to claim 1, wherein the triggering means further comprises third trigger means for triggering inflation of the airbag associated with the driver, the third trigger means being responsive to the output signal from the second threshold means.

13. An airbag system according to claim 1, wherein the second trigger means includes a double input AND gate.

14. An airbag system according to claim 1, further comprising second delay means for providing a second predetermined delay period which is shorter than the first predetermined delay period provided by the first delay means, the second delay means receiving the output of the first threshold means and providing a delayed output signal, the triggering means further comprising third trigger means for triggering inflation of the airbag associated with the driver, the third trigger means being responsive to the delayed output signal of the second delay means and the output signal of the second threshold value means.

15. An airbag system according to claim 14, wherein the second and third trigger means each include a double input AND gate.

* * * * *